UNITED STATES PATENT OFFICE.

HEINRICH PASSBURG, OF MOSCOW, RUSSIA.

PROCESS OF PRODUCING SUGAR-LOAVES.

SPECIFICATION forming part of Letters Patent No. 713,916, dated November 18, 1902.

Application filed September 10, 1902. Serial No. 122,763. (No specimens.)

*To all whom it may concern:*

Be it known that I, HEINRICH PASSBURG, a citizen of the German Empire, residing at Moscow, in the Empire of Russia, have invented a certain new and useful Process of Producing Sugar-Loaves, of which the following is a specification.

This invention relates to a process of treating raw sugar, and has for its object to obviate the disadvantages of the processes now in use, so as to produce sugar of a superior quality in loaves.

It is known that in the treatment of sugar the high temperature has an unfavorable influence on the quality and color of the product.

Hitherto it was usual to cool the boiled-down-sugar solution in loaf, plate, or lump form gradually in warm rooms until the loaf assumed the temperature of the room. Sugar, especially raw sugar, is a poor conductor of heat, and twenty-four to twenty-six hours, according to the size of the molds, were necessary before the sugar was thoroughly cooled to the temperature of the room in which the cooling action took place. This duration of high temperature, however, has been found to exert an unfavorable influence on the sugar, inducing decomposition, whereby the whole mass is caused to assume a darker color, the first syrup draining from the loaf being much darker than what might be expected from a clear sugar.

The object of this invention is to provide a process whereby the boiled-down-sugar solution in condition ready for the usual cooling may be cooled in loaves of the usual or any desired shape without this decomposition and its resulting evils. A solution of this problem I have found which practically and economically accomplishes this desired object. The usual process of boiling down the sugar solution is continued to the customary point, and then the boiled-down mass, in the usual condition for cooling in molds, is placed in the same. Instead, however, of allowing the molds to cool gradually and by degrees assume a low temperature in correspondence with the temperature of the surrounding medium the same are suddenly and forcibly cooled by any suitable means to a temperature of approximately zero centigrade. This cooling action is effected, as stated, immediately upon the solution being placed in the molds, no substantial interim being permitted. The cooling may be effected by inserting the molds in a suitable chamber cooled by liquid air, vacuum, or any other suitable means, and the sugar is thereby reduced with great rapidity to the temperature stated. It is, after draining, then removed from the molds and put through any subsequent treatment in the usual way.

By my improved process the syrup dripping from the molds is much brighter in color than that resulting in the old process, and less covering-syrup is required to be poured over the loaves for the customary final enrichment. A greater percentage of sugar is obtained from the boiled-down mass, and the sugar is of a quality greatly superior to that obtained by the common methods.

Having thus described my invention, I claim as new and desire to secure by Letters Patent—

The process herein described of producing sugar-loaves, which consists in boiling down a sugar solution to the usual consistency for cooling in molds, pouring the mass into molds, and then subjecting it to a rapid cooling operation substantially as set forth.

In testimony that I claim the foregoing as my invention I have signed my name in presence of two subscribing witnesses.

HEINRICH PASSBURG.

Witnesses:
  GUSTAVE HARTWIG,
  HEINRICH DAMMANN.